United States Patent [19]

Lazareff

[11] Patent Number: 4,798,161

[45] Date of Patent: Jan. 17, 1989

[54] DISPLAY DEVICE, IN PARTICULAR FOR AN AUTOMATIC GEAR BOX

[75] Inventor: André Lazareff, Clichy, France

[73] Assignee: Jaeger, France

[21] Appl. No.: 192,226

[22] Filed: May 10, 1988

[30] Foreign Application Priority Data

May 13, 1987 [FR] France ............... 87 06736

[51] Int. Cl.[4] .............................................. B60K 20/00
[52] U.S. Cl. .......................... 116/28.1; 116/DIG. 20; 74/473 R
[58] Field of Search ............ 116/28 R, 28.1, DIG. 20, 116/291, 327, 281; 74/473 R, 473 P, 473 SW, 474, 475, 476, 477

[56] References Cited

U.S. PATENT DOCUMENTS

| | | | |
|---|---|---|---|
| 3,805,733 | 4/1974 | Gilbert | 116/28.1 |
| 3,815,543 | 6/1974 | Bush | 116/28.1 |
| 3,985,095 | 10/1976 | Nurse | 116/28.1 |
| 4,550,675 | 11/1985 | Lansinger et al. | 116/28.1 |
| 4,565,151 | 1/1986 | Buma | 116/28.1 |
| 4,566,399 | 1/1986 | Hildebrand et al. | 116/28.1 |

Primary Examiner—William A. Cuchlinski, Jr.
Assistant Examiner—Petar Arsenovic
Attorney, Agent, or Firm—McCormick, Paulding & Huber

[57] ABSTRACT

A display device comprising: a control member (10); a carriage (50) displaced along a predetermined path (A) by the control member (10); and a plurality of flaps (100) distributed at a constant pitch (p) along the path (A) of the carriage, with each flap (100) being equipped with a cam (120) suitable for engaging the carriage (50) in order to displace the associated flap (100) from a rest position to an operated position. According to the invention said cams (120) are positioned in predetermined different positions relative to the corresponding flaps (100) in order to define a predetermined relationship between carriage displacement and the successive instants at which the flaps (100) are moved.

11 Claims, 4 Drawing Sheets

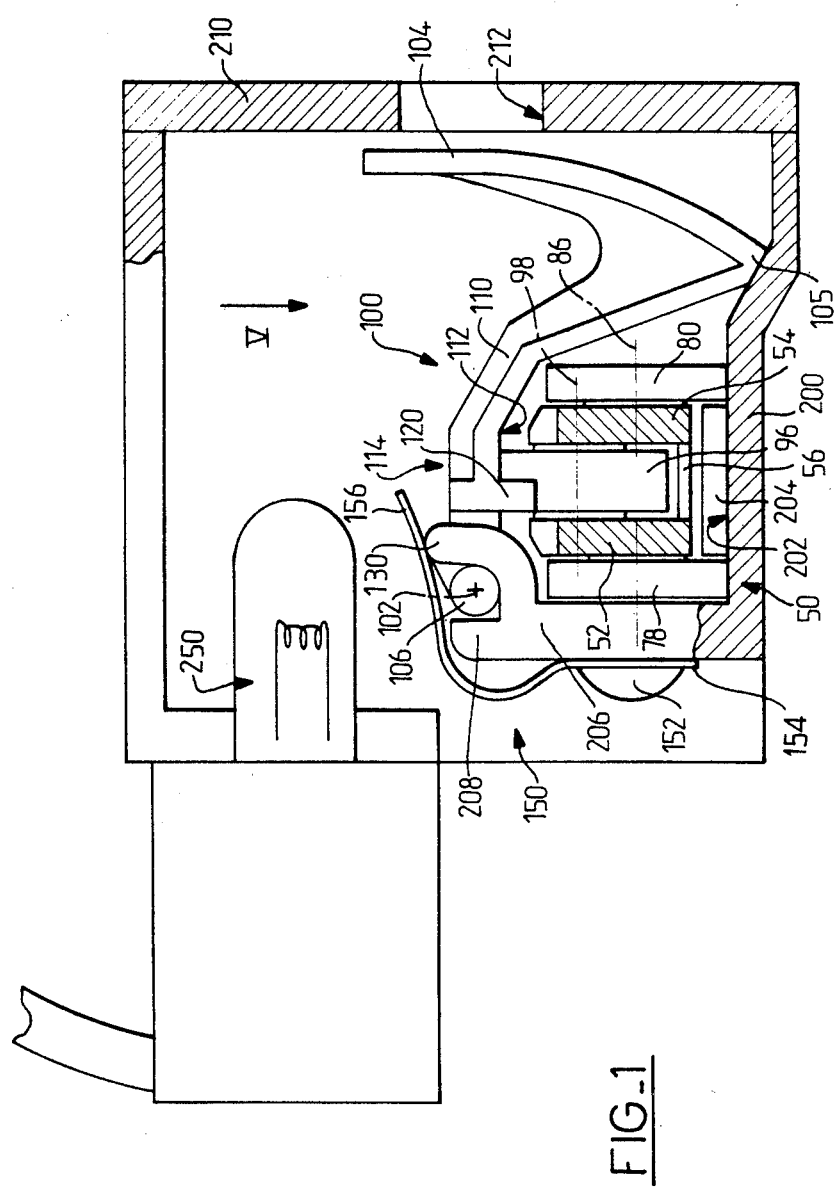
FIG_1

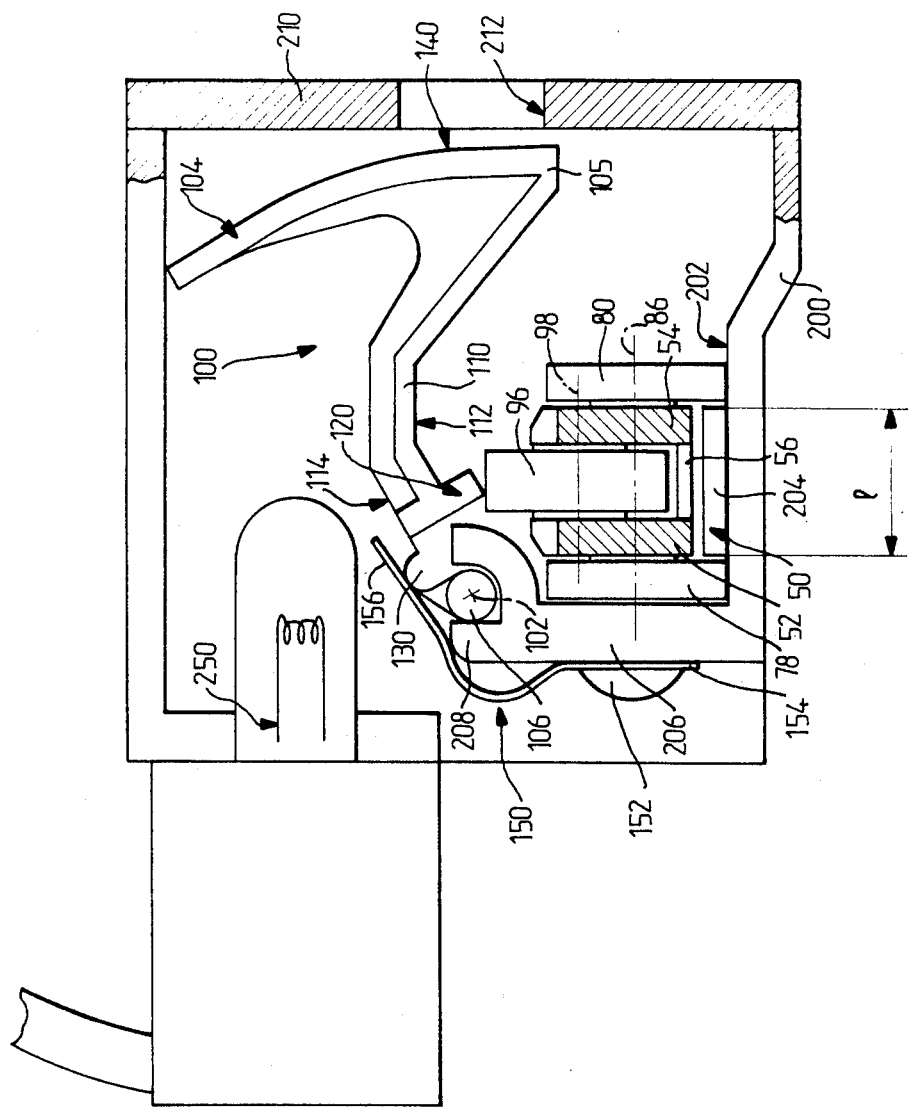
FIG_2

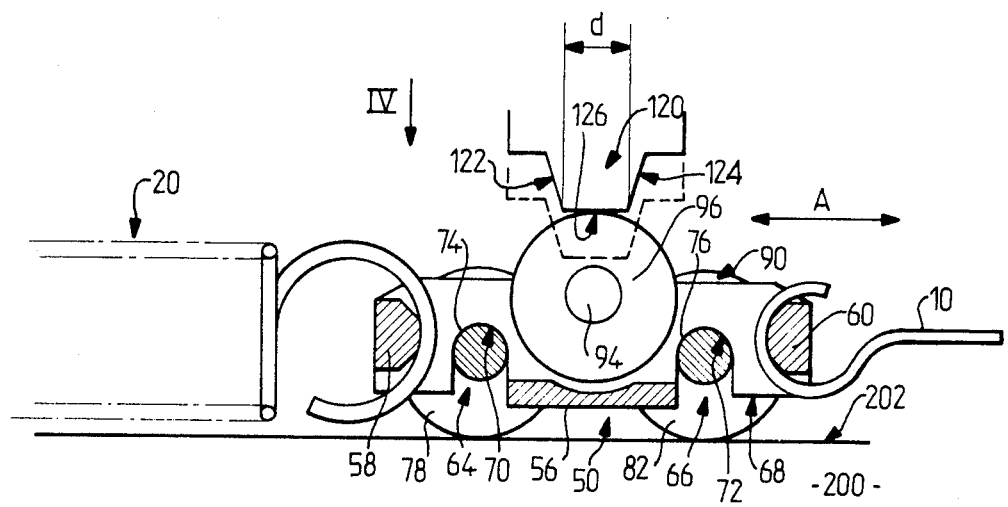
FIG_3
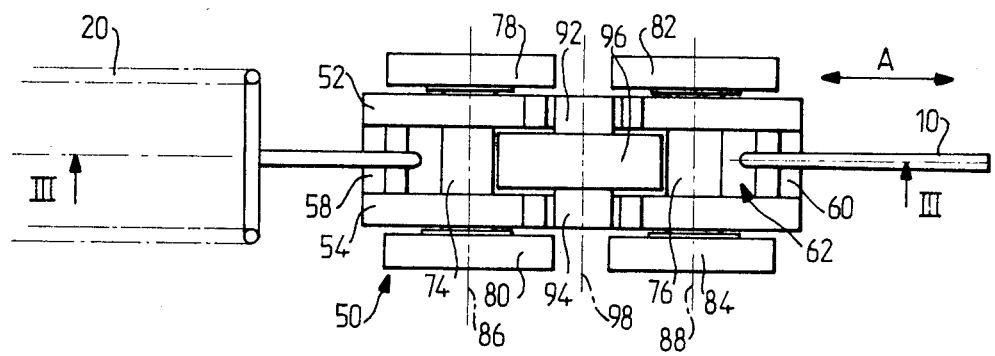
FIG_4

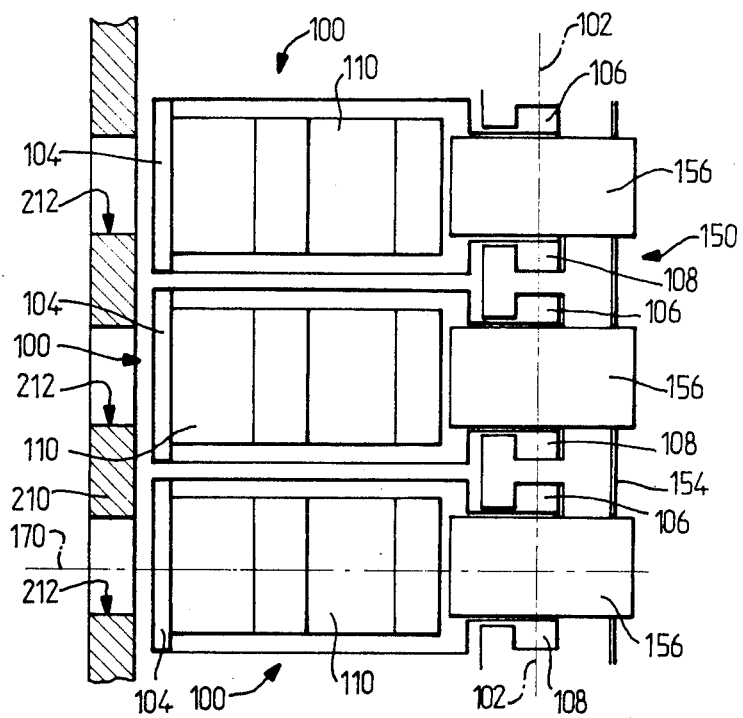
FIG_5
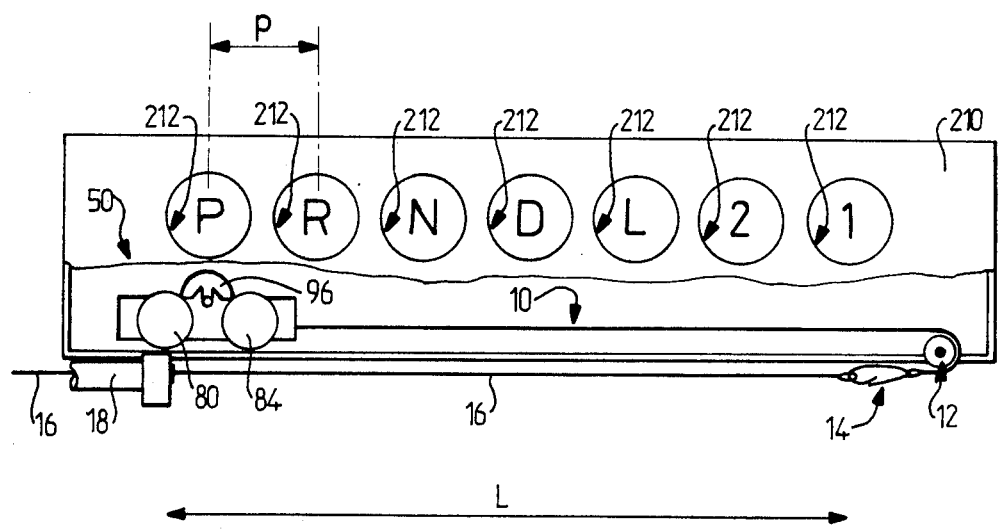
FIG_6

DISPLAY DEVICE, IN PARTICULAR FOR AN AUTOMATIC GEAR BOX

The present invention relates to display devices.

The present invention relates particularly, but not exclusively, to a display device for informing the driver of a motor vehicle about the position of an automatic gear box.

BACKGROUND OF THE INVENTION

Various display devides have already been proposed for automatic gear boxes.

Proposals have been made, for example, for mechanical display devices including an index or flag which is displaced by a cable connected to an active member of the gear box. However, such mechanical devices do not give full satisfaction because the active member connected to the control cable is displaced inside the gear box with a non-uniform pitch, and as a result the index or flag is displaced on the dashboard through corresponding non-uniform steps.

Proposals have also been made for electrical display devices comprising a plurality of light-emitting cells controlled by respective associated switches which are themselves controlled by the active member of the gear box. This arrangement provides a display by means of cells which are at a uniform pitch. However, it suffers from the drawbacks of being expensive and bulky.

The object of the present invention is to avoid the drawbacks of the above-mentioned display devices.

Another object of the invention is to provide a display device suitable for defining the position of an automatic gear box using a regular pitch and under proper control of a control member which is itself displaced at a non-uniform pitch.

SUMMARY OF THE INVENTION

These objects are achieved, by the present invention, by means of a display device comprising:
 a control member;
 a carriage displaced along a predetermined path by the control member; and
 a plurality of flaps distributed at a constant pitch along the path of the carriage, with each flap being equipped with a cam suitable for engaging the carriage in order to displace the associated flap from a rest position to an operated position, said cams being positioned in predetermined different positions relative to the corresponding flaps in order to define a predetermined relationship between carriage displacement and the successive instants at which the flaps are moved.

BRIEF DESCRIPTION OF THE DRAWINGS

An embodiment of the invention is described by way of example with reference to the accompanying drawings, in which:

FIG. 1 is a diagrammatic axial section view of a display device in accordance with the present invention, with the illustrated flap being in the rest position;

FIG. 2 is a similar view in which the illustrated flap is in the operated position;

FIG. 3 is a diagrammatic longitudinal section through the carriage on a section plane referenced III—III in FIG. 4, and it shows, in particular, the co-operation between the carriage and a cam carried by a flap;

FIG. 4 is a plan view of the carriage as seen in the direction of arrow IV in FIG. 3;

FIG. 5 is a diagrammatic plan view of a plurality of flaps as seen in the direction of arrow referenced V in FIG. 1; and FIG. 6 is a diagrammatic overall view of a display device in accordance with the present invention.

MORE DETAILED DESCRIPTION

The accompanying figures show a display device which is essentially constituted by a control member 10 constituted by a cable, a carriage 50 displaced by the control cable 10, and a plurality of flaps 100.

The carriage 50 is moved in translation by the control cable 10 in a direction shown by an arrow referenced A.

The carriage 50 includes two side plates 52 and 54 extending parallel to the direction A. The side plates 52 and 54 are interconnected by a bottom spacer 56 and by two end spacers 58 and 60 which extend substantially transversely to the direction A. A central chamber 62 is thus defined between the side plates 52 and 54.

A pair of notches 64 and 66 are provided in each side plate 52 and 54. The notches 64 and 66 open out to the free bottom edges 68 of the side plates. They terminate inside the side plates in semicylindrical bearing surfaces 70 and 72.

These bearing surfaces 70 and 72 receive shafts 74 and 76 which are free to rotate and each of which carries a pair of running wheels 78 and 80 or 82 and 84.

The wheels 78 to 84 are placed outside the side plates. The axis of the wheels 78 and 80, and of the shaft 74 is referenced 86. The axis of the wheels 82 and 84, and of the shaft 76 is referenced 88. The mutually parallel axes 86 and 88 are orthogonal to the direction A in which the carriage 50 moves.

The radii of the semicylindrical bearing surfaces 70 and 72 are preferably complementary to the radii of the shafts 74 and 76 in order to guide them closely during rotation. However, the notches 64 and 66 are slightly narrower than the diameter of the shafts 74 and 76 in order to enable the shafts 74 and 76 to be inserted in the notches 64 and 66 against the semicylindrical bearing surfaces 70 and 72 by elastically deforming the carriage material, thus preventing the shafts 74 and 76 carrying the carriage-supporting wheels from being freely removed from the notches.

The wheels 78 to 84 project beyond the free bottom edges 68 of the side plates and rest against the surface 202 of a support 200.

Further, each of the side plates 52 and 54 is provided with an additional notch having the same structural disposition as the notches 64 and 66, but opening out into the top surface 90 of each side plate. This second pair of notches receives a pair of coaxial stub axles 92 and 94 provided on either side of a cam-operating wheel 96. The axis of the wheel 96 and the associated stub axles is referenced 98. It extends parallel to the above-mentioned axes 86 and 88.

The wheel 96 projects a long way beyond the top surface of the carriage 50.

The carriage 50 is preferably guided along the direction A by a rail 204 projecting from the top surface 202 of the support 200 and having a width l which is substantially equal to the width of the carriage 50, i.e. to the spacing between the inside facing surfaces of the pairs of wheels 78, 80 and 82, 84.

The flaps 100 are disposed at regular intervals along the path A of the carriage 50.

In the embodiment shown in the accompanying figures, the flaps 100 are pivotally mounted on a bracket 206 which is fixed to the support 200 about an axis 102 extending parallel to the direction A.

In essence, each flap 100 comprises a cylindrical sector 104 centered on the axis 102, a pair of stub axles 106 and 108 coaxial with the axis 102, and a web 110 extending substantially radially from the axis 102 and connecting the stub axles 106 and 108 to the cylindrical sector 104.

The webs 110 are superposed above the path along which the carriage 50 moves, as can be seen in accompanying FIGS. 1 and 2.

Each web 110 is provided with a cam 120 on its bottom surface 112 facing the carriage 50. The radial distance between the cam 120 and the pivot axis 102 is such as to cause the cam 120 to coincide with the path of the wheel 96.

When the wheel 96 on the carriage 50 is not beneath a cam 120, the bottom end 105 of the corresponding sector 104 rests against the support 200. This provides a rest position as shown in FIG. 1.

Insofar as each flap 100 extends to one side of the shaft 102, this rest position may be obtained merely under the effect of gravity.

However, it is preferable for the flaps 100 to be urged towards their rest positions by a resilient member 150.

In the embodiment shown in the accompanying figures, the resilient member 150 is in the form of a comb-shaped structure whose base 154 is fixed by crimping, riveting, or the like at 152 to the bracket 206. The various teeth 156 of the resilient comb 150 rest against return studs 130 provided on the top surfaces 114 of the webs 110, at positions which are at a distance from the axis 102.

However, when the wheel 96 reaches one of the cams 120 as the carriage 50 is displaced, it progressively raises the cam and consequently pivots the associated flap 100 about the axis 102 into an operated or working position as shown in FIG. 2. As shown in FIGS. 1 and 2, a flap 100 moves from its rest position to its operating position by pivoting anti-clockwise.

When the wheel 96 moves beyond a cam 120, the associated flap 100 is returned to its rest position as shown in FIG. 1 by the resilient member 150.

It may be observed that the spring 150 also serves to retain the stub axles 106 and 108 on each of the flaps 100 in the corresponding support fork 208 of the bracket 206.

In order to facilitate engaging the wheel 96 beneath a cam 120, it is preferable for the side surfaces 122 and 124 of each cam 120 which extend substantially transversely to the direction A of movement of the carriage 50 to slope relative to said direction A.

More precisely, they converge symmetrically downwardly.

It may be observed in FIG. 3 that a cam 120 is shown in the operated position in solid lines as raised by the wheel 96 therebeneath. The same FIG. 3 shows the cam 120 in its rest position by means of dashed lines.

The carriage 150 is preferably urged towards a rest position by a spring 20, for example a helical spring operating in traction. The spring 20 may be hooked to the spacer 58 of the carriage 50.

The control cable 10 which operates in traction in the opposite direction to the spring 20 is then fixed to the other spacer 60.

The various flaps 100 are placed facing a wall 210 which is fixed to the support 200. An aligned plurality of windows 212 is provided in said wall 210, with each window being disposed facing a respective one of the flaps 100, and more precisely facing the cylindrical sector 104 carried thereby.

The person skilled in the art will readily understand from reading the above description that as the carriage 50 moves in the direction A, the flaps 100 are moved up and down behind the windows 212 by virtueof the defined co-operation between the wheel 96 and the cams 120.

In other words, when a flap 100 is in the rest position as shown in FIG. 1, the top portion of the corresponding sector 104 faces the associated window 212. Then, as a flap 100 is moved to its operated position by the carriage 50 coming thereunder, as shown in FIG. 2, the bottom portion of the sector 104 is moved to face the associated window 212.

The display achieved in this way through the window 212 may be obtained in various different positions.

In the example given in the accompanying figures, each window 212 may be constituted by a transparent material of a first predetermined color. The sector 104 of the flap 100 is made of a transparent material and is provided in one of its top and bottom portions which alternate in position behind the window 212 with a transparent coating of a second predetermined color constituting a filter. Thus, when a flap 100 is moved from its rest position to its operated position, the window 212 as seen from the outside changes in appearance.

In the accompanying illustration, the coatings of the second predetermined filter-forming color, referenced 140, are located in the bottom portions of the sectors 104.

A light source 250 is preferably placed behind the walls 210 and the sectors 104 in order to provide optimum display at night.

Symbols for identifying the gear currently engaged by the gear box are preferably placed, e.g. by engraving, either on the first color transparent material forming the windows 212, or else on the bottom portions of the sectors 104 which face said windows when in their operated positions.

In a variant, the windows 212 may be clear, i.e. they need not have any material of a first predetermined color, with the bottom regions of the sectors 104 being provided with markings (in color or in the form of symbols) for placing behind the corresponding windows 212 when the flaps 100 are moved into their operated positions.

As is known by the person skilled in the art, currently available automatic gear boxes are of a structure such that the control cable 10 is caused to move at a non-uniform pitch, i.e. through different-sized steps, when successively engaging different gears.

However, as mentioned above, vehicle manufacturers desire to display the engagement of the various different gears at a pitch which is uniform, mainly for reasons of appearance. It can be seen, for example in FIG. 6, that the front wall 210 of a display housing in accordance with the present invention is provided with seven windows 212 which are aligned along a row and are uniformly spaced at a constant pitch p.

Similarly, the flaps 100 placed respectively behind the windows 212 are also disposed at a uniform pitch along the path A of displacement of the carriage 50.

In order to ensure proper interaction between the carriage 50 which is moved at a non-uniform pitch by the gear box, and the display flaps 100 which are disposed at a uniform pitch along the path A of carriage displacement, a fundamental characteristic of the present invention requires the cams 120 to be positioned differently and in controlled manner on the flaps 100 parallel to the pivot axis 102 and along the direction of displacement A in such a manner as to define a relationship, whereby, regardless of the amplitude of carriage displacement between two stable positions of the gear box, so long as a given gear is engaged, the associated flap 100 is moved to its operated position facing the corresponding window 212.

In other words, instead of the cams 120 being symmetrically disposed relative to the general planes of symmetry of the flaps 100, they may be offset to one side or the other of said planes of symmetry 170 parallel to the axis 102 and to the direction A in order to take account of the non-linear displacement of the carriage 50. It may be observed that the above-mentioned planes of symmetry 170 extend orthogonally to the pivot axis 102 and to the direction of displacement A.

At present, the Applicant considers that the most advantageous disposition is to provide for the gap between two cams 120 carried by adjacent flaps 100 for displaying the engagement of respective specific gears to be equal to the amplitude through which the carriage 50 is displaced when it passes from one of said specific gears to the other one of said specific gears.

However, it may be observed that the lengths d of the bases 126 of the cams 120 interconnecting the sloping side surfaces 122 and 124 thereof may differ from one cam 120 to another. The lengths d of the basis 126 determine the amplitudes of carriage displacement during which the associated flaps 100 are held in the operated position by the wheel 96 therebeneath. The lengths d of the bases 126 can thus be adapted to take account of the positioning tolerances of the control cable 10.

Accompanying FIG. 6 is a diagram showing the front wall 210 of a display comprising seven windows 212 which are uniformly spaced and which are provided with the following symbols respectively: "P", "R", "N", "D", "L", "2", "1". FIG. 6 also shows diagrammatically the carriage 50 being pulled by the control cable 10 against the return force from the spring 20. The cable runs parallel to the support 200. The carriage 50 is shown in FIG. 6 in the rest position due to the return force from the spring 20. It is located at a first end of its displacement path A. The control cable 10 passes over a return pulley placed at the second end of the path A of the carriage 50. The control cable 10 is provided with a snap hook 14 downstream from the return pulley 12. The snap hook 14 is fastened to an auxiliary cable 16. The auxiliary cable 16 is connected to the active member of the automatic gear box. The auxiliary cable 16 is engaged in a sheath 18. This is fixed to the support 200 in the vicinity of the first end of the carriage displacement path as shown in FIG. 6.

It may be observed that in order to enable the device shown to operate properly, the length L of the auxiliary cable 16 which emerges from the sheath 18 when the carriage 50 is in its rest position under the urging of the return spring 20 must be equal to the full displacement stroke of the carriage 50.

In other words, when the carriage 50 is moved to the second end of its path A, the spring clip 14 is moved to a position adjacent to the end of the sheath 18.

The disposition shown in FIG. 6 makes it possible to separate the auxiliary cable 16 and the display device in the event that one or other of them needs repairing or replacing, without having to disassemble or replace both of them together.

Naturally, the present invention is not limited to the embodiment which is described above, and extends to any variant thereof falling within the scope of the claims.

Thus, for example, in the above-described embodiment, the flaps 100 are pivotally mounted about an axis 102 running along the path A of carriage displacement. In a variant of the invention, the flaps 100 could be mounted free to move in translation past the windows 212 between a rest position and an operated position transversely to the direction A of carriage displacement.

Also, in the embodiment described with reference to the drawings, the cable which co-operates with the carriage 50 operates in traction against a return spring 20.

It would also be possible for the control cable 10 to push the carriage 50 against a compression spring 20. In this case, there would be no need for the control cable 10 to be fastened to the carriage 50. It could simply come into abutment against one of its axial ends. This disposition could be advantageous for simplifying assembly and disassembly of the display device.

I claim:
1. A display device comprising:
   a control member;
   a carriage displaced along a predetermined path by the control member; and
   a plurality of flaps distributed at a constant pitch along the path of the carriage, with each flap being equipped with a cam suitable for engaging the carriage in order to displace the associated flap from a rest position to an operated position, said cams being positioned in predetermined different positions relative to the corresponding flaps in order to define a predetermined relationship between carriage displacement and the successive instants at which the flaps are moved.

2. A display device according to claim 1, wherein the control member is in the form of a cable.

3. A display device according to claim 2, wherein the control member is constituted by a cable which is actuated by an automatic gear box.

4. A display device according to claim 1, including a spring which urges the carriage towards a rest position against the force exerted by the control member.

5. A display device according to claim 1, wherein the carriage co-operates successively with the cams by means of a cam-operating wheel.

6. A display device according to claim 1, wherein the carriage is guided in translation.

7. A display device according to claim 1, wherein the carriage runs on a plurality of wheels.

8. A display device according to claim 1, wherein the flaps are resiliently urged towards respective rest positions.

9. A display device according to claim 1, wherein each flap is displaced by pivoting between a rest position and an operated position.

10. A display device according to claim 1, wherein each flap is displaced in translation between a rest position and an operated position.

11. A display device according to claim 1, wherein the carriage is urged towards a rest position by a spring against the force exerted by the control member, and by the fact that the control member is in the form of a cable releasably connected to an active auxiliary cable which is itself engaged in a sheath, with the length of the auxiliary cable emerging from the sheath when the carriage is in its rest position being equal to the full displacement stroke of the carriage.

* * * * *